United States Patent
Behrens

[11] 3,791,118
[45] Feb. 12, 1974

[54] COMPACTOR ATTACHMENT FOR A LAWN MOWER

[75] Inventor: Robert Nick Behrens, Horicon, Wis.

[73] Assignee: Deere & Company, Moline, Ill.

[22] Filed: May 18, 1973

[21] Appl. No.: 361,499

[52] U.S. Cl.............. 56/202, 56/14.5, 56/16.6, 15/78
[51] Int. Cl............................................ A01d 38/22
[58] Field of Search.. 56/202, 341, 12.7, 16.6, 16.7, 56/14.5, 17.5; 15/21 R, 78, 82–86

[56] References Cited
UNITED STATES PATENTS

| | | | |
|---|---|---|---|
| 3,222,853 | 12/1965 | Michael | 56/202 |
| 3,641,754 | 2/1972 | Anstee | 56/341 |
| 3,736,736 | 6/1973 | Myers | 56/14.5 |

*Primary Examiner*—Russell R. Kinsey

[57] ABSTRACT

A lawn and garden type tractor has a belly-mounted rotary lawn mower with a side discharge opening communicating with an inlet opening at the lower inner side of a fore-and-aft elongated, material-receiving housing or housing section extending longitudinally alongside the tractor. A substantial portion of the walls of the material-receiving section are foraminous so as not to impede the flow of air created by the cutting blade or blades of the mower and the material-receiving housing is large enough so that material entrained in the flow of air from the mower will be temporarily suspended therewithin before falling onto an auger which is rotatably mounted in the bottom and projecting from the rearward end thereof into a tubular member forming part of an intermediate housing or housing section, the tubular member opening into a relatively large compaction housing or housing section of the structure. The compaction housing is adapted to support a plastic bag or the like in a position with its open end in material-receiving relation to the outlet of the tubular member through means of a removable mounting ring assembly, the bag when so positioned being operable for having material compacted therein by the auger. Once a bag is filled with compacted material, it may be removed from the enclosure and replaced by an empty bag. The housings form part of a unitary structure which is supported on a single ground wheel located at the outer side of the structure and the structure is pivotally connected to the tractor by means permitting it to follow undulations of the ground and move vertically relative to the tractor.

8 Claims, 8 Drawing Figures 3,791,118

COMPACTOR ATTACHMENT FOR A LAWN MOWER

BACKGROUND OF THE INVENTION

This invention relates to an attachment for a rotary lawn mower or the like for collecting and compacting leaves and grass clippings discharged by the mower.

The present invention represents an improvement over the compactor attachment disclosed in application Ser. No. 231,890, now U.S. Pat. No. 3736736, filed 6 Mar. 1972 by Herbert Arthur Myers. The compactor disclosed in the above-identified application includes a generally fore-and-aft tubular auger housing having an inlet opening which communicates with the discharge opening of a rotary lawn mower. An auger is rotatably mounted within the housing and acts to compact material directly into a bag or container or container liner at the rear end of the auger housing. It has been found that this construction is not entirely satisfactory since under some conditions the inlet opening to the auger housing will become choked with material thus resulting in a trail of material being deposited upon the ground. Of course, this trail of material is undesirable because it is unsightly. Further, it has been found that when the bag or container or liner has become filled, a column of compacted material exists at the area of the connection of the bag or container or liner with the discharge end of the auger housing thus making it difficult to remove the same without undue effort or without spilling the material.

Accordingly, it is an object of the invention to provide a compactor attachment which will efficiently receive material discharged from a mower housing and which is constructed such that a filled bag may be easily removed from the compaction chamber without spilling an appreciable amount of material. More specifically, it is an object of the invention to provide a compactor attachment wherein the compaction auger is located within a relatively large material-receiving housing or housing section having foraminous wall portions, the housing thus being constructed to momentarily keep discharged material in suspension so as to minimize choking at the inlet opening thereof. Another specific object is to provide an auger which extends slightly into the bag into which material is being compacted so as to prevent a column of compacted material from existing at the connection of the open end of the bag or liner. Still another object of the invention is to provide a removable mounting ring to which the open end of a bag may be connected, the mounting ring in turn being removably connected in a position for disposing the open end of the bag for receiving material from the auger.

Another object of the invention is to provide a compactor attachment which is unitary in construction and which is supported on the ground by a single ground wheel and is pivotally connected to the tractor through means permitting the attachment to move vertically relative to the tractor.

These and other objects will become apparent from the following description and the appended drawings.

SUMMARY OF THE INVENTION

According to the present invention, there is provided an improved attachment for a lawn mower or the like for compacting leaves or grass clippings into a bag or other suitable container, thereby accomplishing the threefold job of collecting, compacting and packaging such material in one operation.

A compactor attachment comprises a unitary structure including a forward material-receiving section, an intermediate housing or housing section, and a rearward bag-supporting compaction housing or housing section. The material-collecting housing section is relatively large and includes foraminous wall portions for permitting the free flow of air therethrough and has an auger rotatably mounted in a recessed bottom wall portion thereof. The auger extends rearwardly through a tubular member, forming part of the intermediate housing section, and terminates just inside the compaction housing section. A ring-like clamp is releasably mounted in the compaction housing section and is adapted for clampingly holding the open end of a collecting bag in a disposition for receiving material discharged by the auger.

The compactor attachment is supported on a single ground wheel and is adapted for being pivotally connected to a tractor for vertical movement relative to the tractor.

DESCRIPTION OF THE PREFERRED EMBODIMENT

Figure 1:
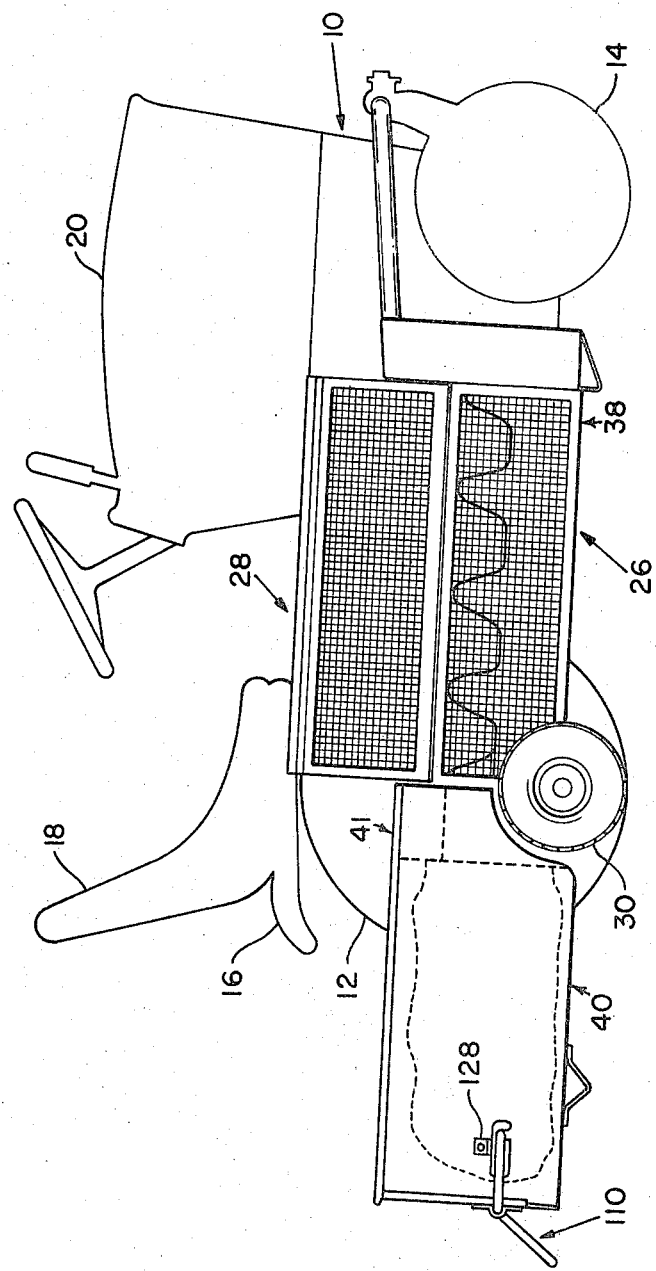
FIG. 1 is a side elevation of the improved compactor attachment mounted on a lawn and garden tractor having a belly-mounted rotary mower.

The compactor attachment for leaves and grass clippings is shown in association with a combination lawn and garden tractor and mower. The lawn and garden tractor has a main frame 10 mounted on a pair of rear drive wheels 12 and steerable front wheels 14, as is conventional. The main frame 10 includes a generally horizontal rear deck structure (not shown) which overlies the transmission and other conventional drive components, the outer rear portions of the deck overlying the rear wheels 12 and functioning as fenders 16. Mounted on top of the deck over the rear axle is an operator's seat 18. As is conventional, the tractor has an internal-combustion engine (not shown) mounted within the usual engine enclosure 20.

A rotary mower is suspended from the tractor main frame 10 between the front and rear wheels 14 and 12 in a manner well known in the art. The mower is of well known construction and includes a generally horizontal housing or mower deck 22 having an open bottom. Mounted within the housing are one or more rotary blades (not shown), the rotating blade or blades acting to sever grass and discharge the grass clippings tangentially to the right through a discharge chute 24 which extends from the right side of the mower deck 22. The lift due to the rotating blade or blades causes the material to generally flow along the underside of the top of the mower deck.

Referring now to FIG. 1, therein is shown a compactor attachment which extends in a fore-and-aft direction alongside the tractor, the attachment being indicated in its entirety by the reference numeral 26. The compactor attachment 26 includes an elongate box-like unitary frame and housing structure 28 supported on a single ground wheel 30 located approximately midway between the opposite ends of the housing structure 28 and at the outer portion thereof relative to the tractor. For the purposes of connecting the housing structure 28 to the tractor, there is provided a rod-like hitch member 32 secured along the inner side of the structure 28 and having a forward end portion curved inwardly to a location at the forward end of the tractor and terminating in a connection portion 34 which cooperates with a mounting portion (not shown) on the tractor for establishing a first pivotal connection permitting the housing structure 28 to move about a first longitudinal axis. The rod-like hitch 32 further includes a rearward portion which extends around one of the rear wheels 12 and terminates at a socket 36 which, in conjunction with a mating part secured to the tractor frame, defines a second pivot connection for permitting the housing structure 28 to move vertically relative to the vehicle frame. The axes defined by the forward connection portion 34 and the rearward connection socket 36 are not in alignment; therefore, vertical movement of the housing structure 28 is somewhat resisted by the stiffness of the hitch 32.

Figure 4:
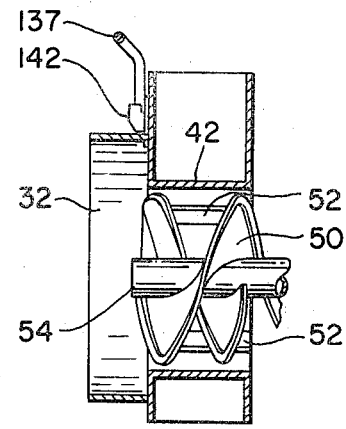
FIG. 4 is a sectional view taken along the line 4—4 of FIG. 3.

The housing structure 28 includes a forward material-receiving housing or housing section 38, and a rearward bag-supporting, compaction housing or housing section 40 between which are located an intermediate housing or housing section 41 including a tubular member 42 which extends between and has its opposite ends secured to parallel longitudinally spaced rear and front end walls 44 and 46, respectively, of the front and rear housing sections 38 and 40. The end walls 44 and 46 respectively contain circular openings which are coaxially disposed relative to each other and the tubular member 42 so as to form a tubular passageway between the material-receiving section 38 and the bag-supporting, compaction section 40. A longitudinally extending auger pan 48 forms the bottom portion of the forward housing section 38 and is curved cylindrically about the longitudinal axis of the tubular member 42. An auger 50 conforming to the curvature of the auger pan 48 is received therein and has its forward end rotatably journaled in a forward end wall 51 of the housing section 38 and has its rearward end portion rotatably supported on a plurality of bearing blocks 52 extending axially in the tubular member 42 and being spaced about the circumference thereof in engaging relationship with the auger flighting. For a purpose to be explained below, the rear end of the auger 50 extends a short distance into the compactor section 40 as can be seen at 54 in FIG. 4.

Figure 2:
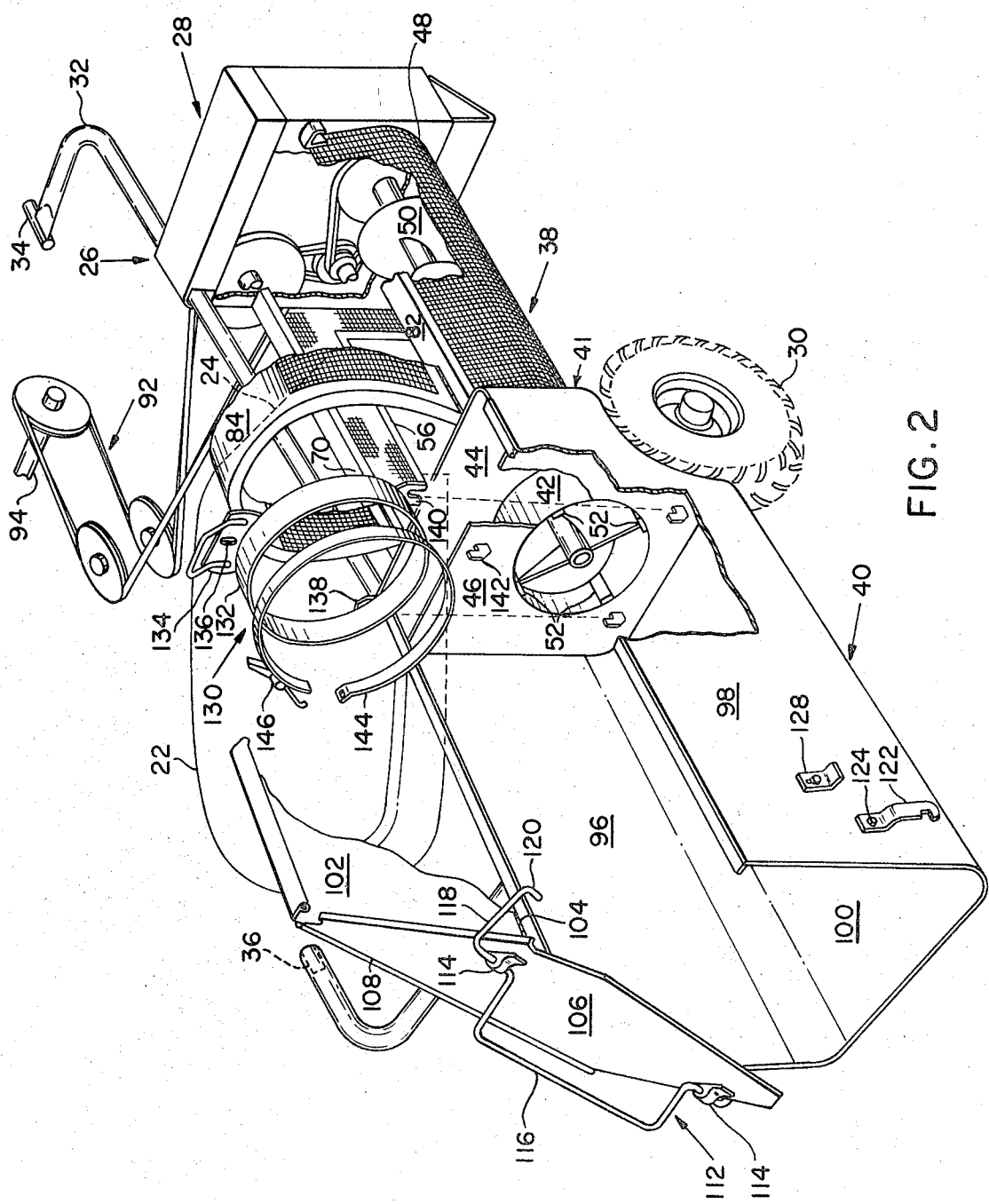
FIG. 2 is a perspective view of the compactor attachment with portions being broken away and with the bag clamping ring being shown in exploded fashion.
Figure 3:
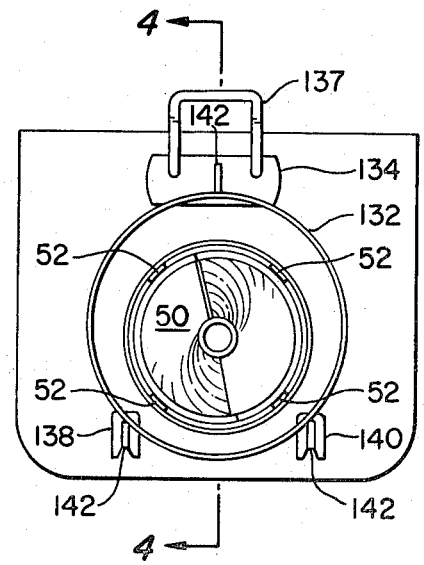
FIG. 3 is a rear elevational view showing the inner portion of the clamping ring mounted in its position for disposing a collecting bag for receiving material from the discharge end of the auger.
Figure 6:
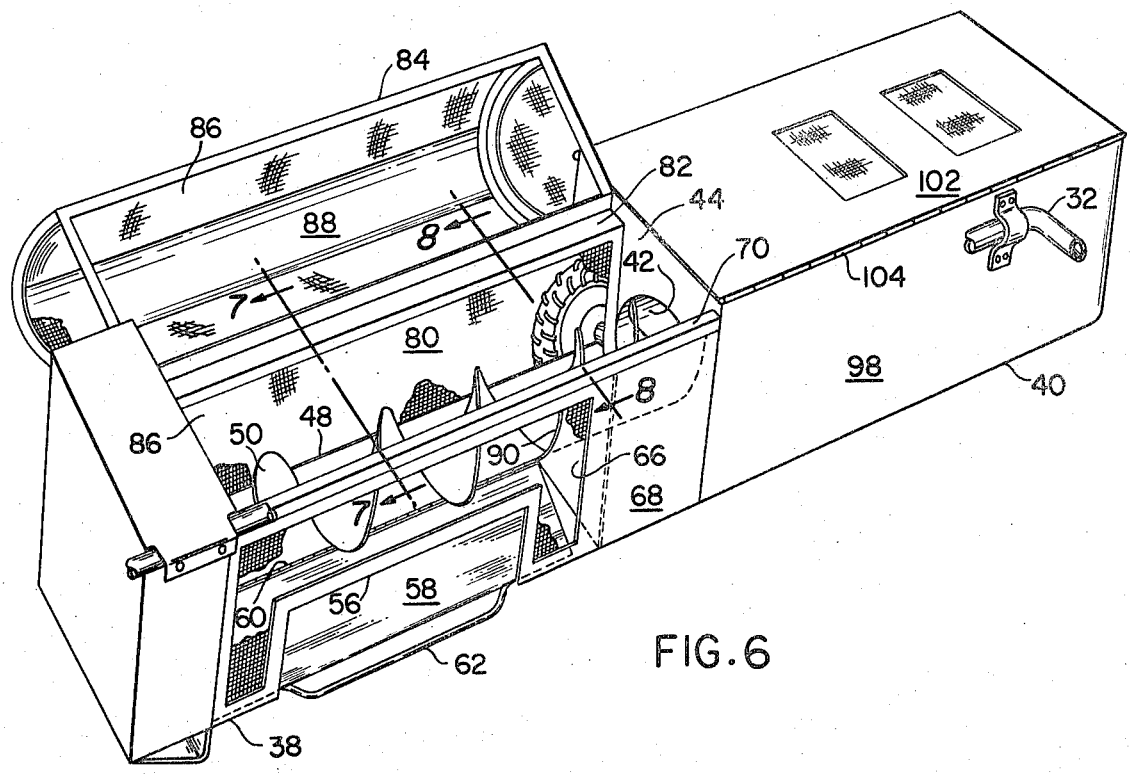
FIG. 6 is a perspective view of the compactor assembly as it appears in a direction opposite to that of the view of FIG. 1.
Figure 7:
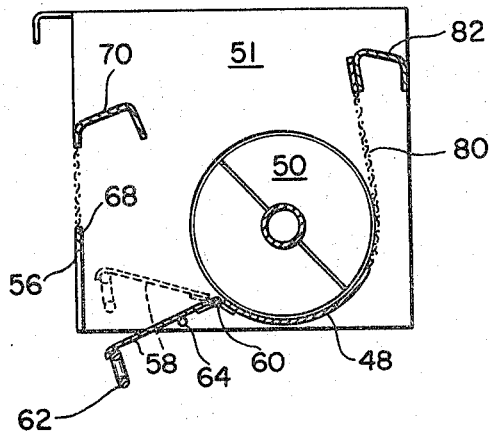
FIG. 7 is a view taken along the line 7—7 of FIG. 6.
Figure 8:
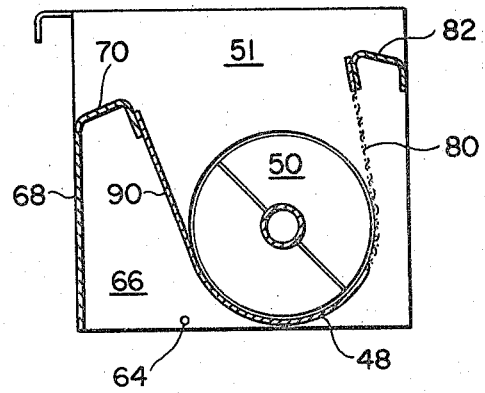
FIG. 8 is a view taken along the line 8—8 of FIG. 6.

As can best be seen in FIGS. 2 and 6, the mower discharge chute 24 is received within a rectangular inlet opening 56 located in the lower inner portion of the material-receiving housing section 38. The mower discharge chute 24 overlies a rectangular baffle or guide plate 58 which has its outer edge hingedly interconnected with the inner edge of the auger pan 48 through defining a hinge joint 60. Fixed to the other side of the plate 58 adjacent its forward and rear portions is a ground-engaging runner 62 which serves to prevent the baffle or guide plate 58 from gouging into the ground. Downward movement of the baffle plate 58 is limited by a pair of stop pins 64 respectively fixed to the front end wall 51 of the material-receiving housing section 38 and a wall section 66 at the rear edge of the baffle plate 58. The rectangular inlet opening 56 is located in an inner wall 68, the upper end of which terminates in a longitudinally extending channel member 70. An outer wall 80 is connected to the outer edge of the auger pan 48 and has an upper terminal end formed by a longitudinally extending channel member 82. Extending between and having corresponding longitudinally extending frame portions overlying the channel members 70 and 82 is a top member 84 which is generally horseshoe-shaped in transverse cross section, the top member 84 thus forming upward continuations of the inner and outer walls 68 and 80, respectively. It is to be noted that the material-receiving housing section 38 just described has a height which is more than twice the diameter of the auger 50 thus leaving a substantial amount of space above the auger. Further, it is to be noted that the inner and outer walls 68 and 80 and the top member 84 are substantially constructed of screen material 86 which will readily permit the passage of air therethrough but will prevent the passage of grass clippings and leaves and the like. Thus, it will be appreciated that some of the material being expelled from the lower deck discharge chute 24 will be entrained in air and will be on a trajectory which will carry it above the auger 50. Since the screen material 86 will offer little impedence to the flow of the air, the air will act to keep a certain amount of the entrained material in suspension above the auger so as to minimize plugging at the inlet opening 56, the curvature of the top member 84 acting to cause the material to flow through a central air impervious section 88 located directly above the auger from where the material will gravitate to the auger. The curvature of the top member 84 thus acts to maintain a material flow which will limit the amount of material that will be held against or embedded in the screen material. In order to form a low-pressure area for attracting suspended material, an air impervious baffle plate 90 is connected between the channel member 70 of the inner wall 68 and the inner edge of the auger pan 48, the baffle plate 90 extending longitudinally between the rear end wall 44 of the material-receiving housing section 38 and the wall section 66 at the rear edge of the hinged baffle plate 58.

The power for driving the auger 50 may be derived from any source, a drive means indicated in its entirety by the reference numeral 92 being shown in FIG. 2 for conveying power from a horizontal output shaft 94 of the tractor engine (not shown) to the forward end of the auger 50.

The rearward compaction housing section 40 is in the form of a rectangular box and includes inner and outer upright walls 96 and 98 and a bottom horizontal wall 100 all having their forward edges formed integrally with the front end wall 46. A top or cover 102 overlies the upper edges of the front end, inner and outer walls 46, 96 and 98, respectively, and has its inner edge hingedly connected, as at 104, to the top of the inner wall 96. Closing the rear end of the compaction section 40 is an end gate or end wall 106 having its upper edge hingedly connected, as at 108, to the rear edge of the top or cover 102. The top and end walls 102 and 106, respectively, may thus be moved as a unit about the hinged connection 104, the end wall 106 being pivotal relative to the top 102 about the hinge connection 108.

Figure 5:
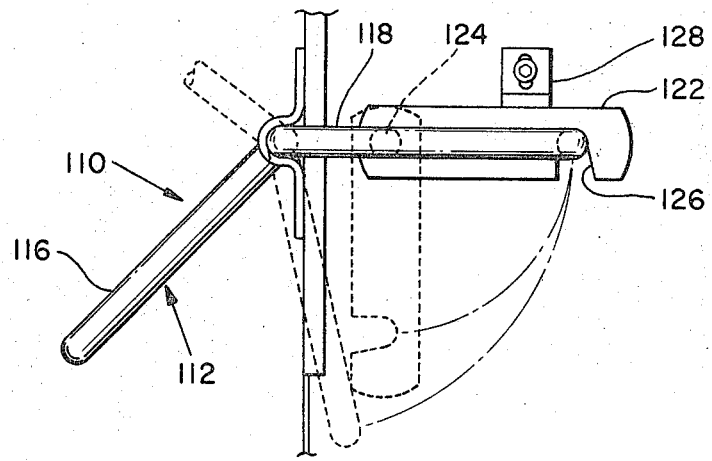
FIG. 5 is an enlarged side view showing the latch for closing the compaction chamber, solid and dashed lines respectively being used to show the latch in latched and unlatched positions.

For the purpose of retaining the top 102 and the end wall 106 in a closed position, as shown in FIGS. 1 and 6, there is provided a latch mechanism indicated in its entirety by the reference numeral 110. The latch mechanism 110 includes an actuator rod 112 which is pivotally connected to the rear face of the end wall 106, as at spaced inner and outer pivotal connections 114, for vertical pivotal movement about an axis which extends perpendicular to the inner and outer sides of the end gate or wall 106. The actuator rod 112 includes a central cranked section 116 located between the pivotal connections 114 and forming a handle. The outer end of the actuator rod 112 extends beyond the outer side of the end gate 106 and has a terminal end section 118 which extends first in a direction forming an obtuse angle with the cranked section 116 and then extends inwardly to form a latch-engaging tip 120. A strap-like latch arm 122 is pivotally connected to the outer side of the outer wall 98, as at 124, and has a notch 126 located therein for receiving the tip 120 of the actuator rod when the end gate or wall 106 is closed and the actuator rod is swung from its dashed line latch-releasing position shown in FIG. 5 to its solid line latched position. The tip 120 of the actuator rod is slightly over center relative to the pivot 124 and the pivotal axis of the actuator rod when the latter is in its latched position. A vertically adjustable stop 128 is secured to the outer side of the outer wall 98 so as to limit the movement of the latch arm 122 to that position whereat the end will be just slightly overcenter. When in the overcenter position, the weight of the crank section 116 of the actuator rod 112 together with the resistance of the overcenter action is sufficient to keep the rod in its latched position, it being noted that the dimensioning of the end section 118 relative to the position of the notch 126 is such that the latch arm 122 will be placed in tension when the tip 120 of the end section 118 is on center relative to the pivot 124 and the axis of swinging of the actuator rod 112.

A bag clamp 130 is provided for holding the open end of a bag in material-receiving disposition relative to the rear end of the auger 50. Specifically, the bag clamp 130 includes an inner ring 132 having a small plate 134 secured to the upper central portion of the forward side thereof, the plate containing a vertically elongated opening 136. Spaced equidistant from the plate 134 and located at opposite lower forward side portions of the inner ring 132 are inner and outer downwardly opening slotted tabs 138 and 140. Fixed to the front end wall 46 of the compaction housing section 40 are outwardly and upwardly projecting hooks 142 placed so as to respectively extend into the opening 136 and the slotted tabs 138 and 140 of the inner ring 132 to fix the latter in surrounding relationship to the rear end of the auger 50. Once the open end of a bag is slipped over the inner ring 132, it may be clampingly held thereon through means of a separable outer ring 144 having an overcenter clasp 146 at one end thereof for releasably securing the separable ends of the outer ring together.

The operation of the compactor attachment 26 is as follows. Assuming that the tractor and mower combination are being advanced over a lawn being mowed, the mower blade or blades will act within the housing 22 to cut material and discharge it through the discharge chute 24 into the material-receiving housing section 38 of the compactor attachment 26. The hinged baffle or guide plate 58 will act to ensure that material and air passing through the discharge chute 24 will be directed upwardly into the housing section 38. Some of this material will be immediately caught by the flighting of the auger and will be advanced towards the compaction housing section 40 while some of the material will be carried by the air into suspension above the auger 50, the air escaping through the screen material 86 and the material finally falling into the auger.

A bag will be disposed, as shown in FIG. 1, for receiving material from the auger 50 and material will be compacted into the bag by the auger. When the bag is filled, it may be removed by first unlatching the latch mechanism 110 by rotating the actuator rod 112 counterclockwise as viewed in FIG. 5, by then pivoting the top or cover 102 to its open position and then by grasping the handle 137 of the inner ring of the bag clamp 130 and elevating the same to release the inner ring from the hooks 142. It is to be noted that this lifting of the inner ring 132 is relatively easy since the rear end 54 of the auger 50 extends slightly into the compaction section 40 of the housing structure 28 and prevents a column of compacted material from forming at the interface between the ring 132 and the front end wall 46 of the housing structure section 40. Once the filled bag has been elevated to an upright position, the bag clamp 130 may be removed therefrom by releasing the clasp 146 thus releasing the outer ring 144. The filled bag end is then tied shut in any conventional manner and the filled bag is deposited where desired. The open end of an unfilled bag is then slipped over the inner ring 132 of the bag clamp and the outer ring 144 is once again clamped into place, the inner ring 132 then being returned to its suspended or mounted position on the hooks 142. Once the unfilled bag is disposed horizontally on the bottom wall 100 of the housing structure section 40, the top or cover 102 is again closed and the latch mechanism 110 is again moved to its latch-engaging position shown in solid lines in FIG. 5.

I claim:

1. A material compactor of the type adapted for receiving material discharged from the housing of a tractor-mounted rotary mower, comprising: a substantially box-like structure defining a first enclosed, elongate housing section having top, bottom and spaced front and rear end walls and spaced inner and outer side walls; a second enclosed, elongate housing section having top, bottom and spaced front and rear end walls and spaced inner and outer side walls; an intermediate housing section securing said first and second housing sections together to form one elongate structure with said rear and front end walls respectively of said first and second housing sections being in adjacent spaced relationship to each other and having respective axially aligned circular openings therein; said intermediate housing section including a tubular member extending between and being fixed to said rear and front walls in axially aligned relationship to said circular openings; an auger having a majority of its length located in said first housing section and having a rear end portion located in said tubular member; said bottom wall of said first housing section being cylindrically curved and receiving approximately the lower half of said auger; said inner side wall of said first housing section having an inlet opening located in a lower portion thereof for receiving material discharged from the housing of a rotary mower; said outer side wall of said first housing section being substantially foraminous; and said first housing section being at least twice as high as the diameter of said auger.

2. The material compactor defined in claim 1 wherein an inner collecting bag-retaining ring is removably connected to said front end wall of said second housing section inside said second housing section in substantial axial alignment with said tubular member; outer ring means for releasably clamping the open end of a bag received on said inner retaining ring and said auger extending a short distance past said tubular member into said second housing section for preventing the formation of a compacted material column immediately rearwardly of the tubular member so as to minimize the difficulty of removing the inner collecting bag-retaining ring when a filled bag is being removed from the second housing section.

3. The material compactor defined in claim 2 wherein said front end wall of said second housing section has three upwardly projecting hooks fixed thereto in a triangular arrangement disposed about the opening therein; and said inner bag-retaining ring having three hook-receiving parts respectively receiving said three hooks.

4. The material compactor defined in claim 1 wherein said box-like structure is mounted on ground-engaging means; an attaching structure means being fixed to said box-like structure and being adapted for pivotally securing said box-like structure to a tractor for vertical movement relative thereto.

5. The material compactor defined in claim 1 wherein a baffle member is hingedly connected along an edge portion of said bottom wall which edge portion defines the lower edge of said inlet opening and is inclined downwardly and away therefrom and has an upper surface arranged for guiding air-entrained material, discharged from a rotary mower housing, through said inlet opening; and skid means secured to the bottom surface of said baffle along an edge thereof remote from the inlet opening for effecting pivotal movement of the baffle in correspondence with uneven ground surface areas.

6. The material compactor defined in claim 1 wherein said inner side and rear end walls of said second housing each includes upper edges and said top wall of said second housing includes inner and rear edges; first and second hinge means respectively interconnecting said inner and rear edges of said top wall respectively with the top edge of said inner wall and the top edge of said rear end wall; and an overcenter latch means mounted on said rear housing section for releasably retaining said top and rear end walls in a closed position wherein they cooperate with the front end, bottom and outer side walls of said second housing to form an enclosure.

7. The material compactor defined in claim 6 wherein said overcenter latch means includes an actuator rod pivotally mounted on said rear end wall of said second housing section for rotation about an axis which extends substantially horizontal when said top and rear end walls of said second housing are in said closed position; said actuator rod including a central cranked portion spaced away from the last-named rear end wall and defining a handle extending generally parallel to the pivotal axis of the actuator rod; and said overcenter means further including means responsive to downward movement of said cranked portion for effecting an overcenter latched condition in said latch means and responsive to upward movement of said cranked portion for effecting an unlatched condition in said latch means.

8. A material compactor of the type adapted for receiving material discharged from the housing of a tractor-mounted rotary mower, comprising: an elongate material-receiving housing having a material-receiving inlet disposed in a lower portion thereof and having a bottom recessed to form an upwardly opening elongate trough curved cylindrically about a fixed axis; said housing further having a rear end wall in which a circular opening is located in coaxial relationship to said fixed axis; a tubular member being fixed against said rear end wall exteriorly of said material-receiving housing in coaxial relationship to said circular opening; a material compacting housing connected to said tubular member for receiving material therefrom; and an auger being received in said elongate trough and tubular member and rotatably mounted for feeding material from said material-receiving housing to said material compaction housing; and said material-receiving housing being at least twice as high as the diameter of said auger and a substantial portion of the walls thereof being foraminous.

* * * * *